US012673299B2

(12) United States Patent
Lee et al.

(10) Patent No.: US 12,673,299 B2

(45) Date of Patent: Jul. 7, 2026

(54) SHEATH-CORE CONJUGATED FIBER FOR SUPPORTER OF WATER TREATMENT SEPARATION MEMBRANE, SUPPORTER COMPRISING SAME FOR WATER TREATMENT SEPARATION MEMBRANE, WATER TREATMENT SEPARATION MEMBRANE COMPRISING SAME, AND FILTER MODULE COMPRISING SAME

(71) Applicant: TORAY ADVANCED MATERIALS KOREA INC., Gumi-si (KR)

(72) Inventors: Geon Sang Lee, Gumi-si (KR); Sung Geun Cho, Gumi-si (KR); Song Jung Han, Gumi-si (KR); Do Hyun Kim, Gumi-si (KR)

(73) Assignee: TORAY ADVANCED MATERIALS KOREA INC., Gumi-si (KR)

( * ) Notice: Subject to any disclaimer, the term of this patent is extended or adjusted under 35 U.S.C. 154(b) by 402 days.

(21) Appl. No.: 18/556,321

(22) PCT Filed: Aug. 29, 2022

(86) PCT No.: PCT/KR2022/012885

§ 371 (c)(1),
(2) Date: Oct. 19, 2023

(87) PCT Pub. No.: WO2023/113144

PCT Pub. Date: Jun. 22, 2023

(65) Prior Publication Data

US 2024/0207792 A1 Jun. 27, 2024

(30) Foreign Application Priority Data

Dec. 16, 2021 (KR) ........................ 10-2021-0180899

(51) Int. Cl.

| | |
|---|---|
| ***B01D 69/10*** | (2006.01) |
| ***B01D 71/56*** | (2006.01) |
| ***C02F 1/44*** | (2023.01) |
| ***D01F 8/14*** | (2006.01) |
| ***D04H 1/435*** | (2012.01) |
| ***D04H 1/541*** | (2012.01) |

(52) U.S. Cl.

CPC ......... *B01D 69/1071* (2022.08); *B01D 71/56* (2013.01); *C02F 1/44* (2013.01); *D01F 8/14* (2013.01); *D04H 1/435* (2013.01); *D04H 1/5412* (2020.05); *D10B 2505/04* (2013.01)

(58) Field of Classification Search

CPC ........... B01D 2325/24; B01D 67/0027; B01D 69/10; B01D 69/1071; B01D 69/12; B01D 71/48; B01D 71/56; B01D 71/82; C02F 1/44; D01D 5/34; D01F 1/10; D01F 8/14; D04H 1/435; D04H 1/5412; D10B 2505/04

See application file for complete search history.

(56) References Cited

U.S. PATENT DOCUMENTS

2021/0322927 A1 10/2021 Cho et al.

FOREIGN PATENT DOCUMENTS

| | | | |
|---|---|---|---|
| CN | 110062827 | A | 7/2019 |
| JP | 2000-005576 | A | 1/2000 |
| JP | 2010-194478 | A | 9/2010 |
| JP | 2011-127261 | A | 6/2011 |
| JP | 2011-212602 | A | 10/2011 |
| JP | 2013-064156 | A | 4/2013 |
| JP | 2015-085277 | A | 5/2015 |
| JP | 2021-123811 | A | 8/2021 |
| JP | 2021-171759 | A | 11/2021 |
| KR | 10-2013-0131002 | A | 12/2013 |
| KR | 10-2014-0073009 | A | 6/2014 |
| KR | 10-2016-0079347 | A | 7/2016 |
| KR | 10-1834666 | B1 | 3/2018 |
| KR | 10-2021-0129305 | A | 10/2021 |
| KR | 10-2021-0132450 | A | 11/2021 |
| WO | WO 2020/004462 | A1 | 1/2020 |

OTHER PUBLICATIONS

International Search Report dated Dec. 13, 2022 in International Application No. PCT/KR2022/012885.

Office Action dated Nov. 19, 2024 in Japanese Patent Application No. 2023-567021 in 14 pages.

Notice of Allowance received in JP Application No. 2023-567021 dated Oct. 21, 2025.

Office Action received in Japanese Application No. 2023-567021 dated May 13, 2025.

Office Action received in Chinese Application No. 202280031161.X dated Jul. 4, 2025.

*Primary Examiner* — Dirk R Bass

(74) *Attorney, Agent, or Firm* — Knobbe, Martens, Olson & Bear, LLP

(57) ABSTRACT

The present invention relates to a sheath-core conjugated fiber for a supporter of a water treatment separation membrane, the fiber being harmless to the human body without the elution of heavy metals and having excellent color transparency and strength, a supporter comprising the same for a water treatment separation membrane, a water treatment separation membrane comprising the same, and a filter module comprising the same.

5 Claims, No Drawings

SHEATH-CORE CONJUGATED FIBER FOR SUPPORTER OF WATER TREATMENT SEPARATION MEMBRANE, SUPPORTER COMPRISING SAME FOR WATER TREATMENT SEPARATION MEMBRANE, WATER TREATMENT SEPARATION MEMBRANE COMPRISING SAME, AND FILTER MODULE COMPRISING SAME

CROSS-REFERENCE TO RELATED APPLICATION

This application claims priority to and the benefit of Korean Patent Application No. 10-2021-0180899, filed on Dec. 16, 2021, the disclosure of which is incorporated herein by reference in its entirety.

TECHNICAL FIELD

The present invention relates to a sheath-core conjugated fiber for a supporter of a water treatment separation membrane, a supporter for a water treatment separation membrane including the same, a separation membrane for water treatment including the same and a filter module including the same.

BACKGROUND ART

The non-woven fabric used as a base material in most filters is polyethylene terephthalate fiber, and since the conventional polyethylene terephthalate fiber uses an antimony-based polymerization catalyst, there is a problem in that when it is stagnant in water, antimony, which is a type of heavy metal, leaches out, and thus, there is a concern that in the future, the problem of heavy metals leached from the non-woven fabric may lead to the issues of hazardous substances occurring in the drinking water filter market.

For this reason, various compounds have been conventionally proposed as catalysts in place of antimony compounds or germanium compounds in the production of the polyethylene terephthalate fibers, and among these, several types of titanium (Ti) compounds have been proposed because they are inexpensive and do not have toxicity problems. However, polyester resins using titanium compounds as catalysts have the disadvantage of having a characteristic yellow color and poor thermal stability, and for example, the decomposition reaction which occurs during polycondensation or melt molding such that it produces a large amount of by-products such as acetaldehyde. Therefore, the situation is that it is necessary to develop the manufacturing method of a polyester resin that can solve problems such as improving the color tone and thermal stability of the manufactured polyester resin and reducing the acetaldehyde content.

DISCLOSURE

Technical Tasks

The present invention has been devised to solve the above-described problems, and is directed to manufacturing a sheath-core conjugated fiber for a supporter of a water treatment separation membrane which has excellent bonding strength with a support layer of the water treatment membrane, is significantly less harmful to the human body and has excellent color transparency and strength, a supporter for a water treatment separation membrane including the same, a water treatment separation membrane including the same, and a filter module including the same.

Technical Solution

The sheath-core conjugated fiber for a supporter of a water treatment separation member according to the present invention for solving the above-described problems includes a core; and a sheath, wherein the sheath includes a polyester resin for sheath.

In an embodiment of the present invention, the polyester resin for sheath may include a polycondensation product obtained by ester reaction and polycondensation reaction of an acid component; and a diol component, wherein the acid component may include 20 to 40 mol % of isophthalic acid (IPA) and the remaining amount of terephthalic acid (TPA), and wherein the diol component may include a compound represented by Chemical Formula 1 below.

In an embodiment of the present invention, the polyester resin for sheath may have a carboxyl group (—COOH) content of $4.5\times10^{7}$ eq/g or less.

In an embodiment of the present invention, the sheath-core conjugated fiber may include the sheath and core at a weight ratio of 1:1.5 to 1:4.0.

As another object of the present invention, it is possible to manufacture a supporter for a water treatment separation membrane, including the above-described sheath-core conjugated fiber.

In an embodiment of the present invention, the supporter for a water treatment separation membrane may be a non-woven fabric.

In an embodiment of the present invention, the supporter for a water treatment separation membrane may further include PET single fibers in addition to the sheath-core conjugated fiber.

In an embodiment of the present invention, the supporter for a water treatment separation membrane may be a hot melt non-woven fabric which is manufactured by mixing and opening the sheath-core conjugated fiber and PET single fibers and then heat-treating the same.

In an embodiment of the present invention, in the supporter, when a specimen which is cut from the supporter to a weight of 0.7 g is immersed in 1,000 g of deionized water (DI water) with a purity of 99.9% or higher for 100 hours and then taken out and the concentration of a heavy metal element eluted in the deionized water is measured, the elution amount of heavy metal may be 1 ppm or less, and wherein the heavy metal element may have an atomic mass of 63 to 200 Da (dalton) and a density of 4.0 g/$cm^3$ or more.

As still another object of the present invention, it is possible to manufacture a water treatment separation membrane, including the supporter; a support layer which is formed on one or both sides of the supporter; and an active layer which is formed on the surface of the support layer.

In an embodiment of the present invention, the support layer may include at least one selected from polysulfone polymer, polyacrylonitrile polymer and polyethersulfone polymer.

As still another object of the present invention, it is possible to manufacture a filter module including a filter in which at least one water treatment separation membrane is wound in a spiral shape on the outer surface of a perforated pipe.

Advantageous Effects

Through the present invention, it is possible to provide a sheath-core conjugated fiber for a supporter of a water treatment separation membrane which has excellent bonding strength with a support layer of the water treatment membrane, is significantly less harmful to the human body and has excellent color transparency and strength, a supporter for a water treatment separation membrane including the same, a water treatment separation membrane including the same, and a filter module including the same.

MODES OF THE INVENTION

Hereinafter, the present invention will be described through the following examples. In this case, the following examples are only presented to illustrate the invention, and the scope of the present invention is not limited by the following examples.

The sheath-core conjugated fiber for a supporter of a water treatment separation membrane according to the present invention may include a core; and a sheath.

In this case, the sheath-core conjugated fiber may be manufactured by performing a process including a first step of obtaining a spinning product by composite spinning a resin for core and a resin for sheath; and a second step of stretching the spinning product to manufacture a sheath-core conjugated fiber.

The composite spinning in the first step may be performed at a spinning speed of 3,000 to 5,400 mpm, and preferably, at a spinning speed of 4,000 to 5,200 mpm. If the spinning speed is less than 3,000 mpm, there is a problem in that the stretching ratio is lowered without reaching the desired stretching ratio in the subsequent stretching process, and if the spinning speed is more than 5,400 mpm, there may be a problem in that the fiber may be cut off during spinning.

Next, the stretching of the second step may be performed by 2.0 to 5.0 times, and preferably, by 2.0 to 4.0 times. In this case, when the stretching is performed by less than 2.0 times, yarn uniformity (evenness) may be defective or the strength of the core may be reduced due to poor orientation of the core and/or sheath of the sheath-core conjugated fiber. In addition, when the stretching is performed by more than 5.0 times, there may be a problem in that spinning movability deteriorates and the fusion speed due to over-stretching of the sheath part decreases.

The core-sheath-type composite fiber manufactured in this way preferably includes the sheath and the core at a weight ratio of 1:1.5 to 1:4.0, and preferably, at a weight ratio of 1:1.8 to 3.0. In this case, if the weight ratio of the core is less than 1.5, there may be a problem in that mechanical properties such as strength of the composite fiber are lowered, and if the weight ratio of the core part is more than a weight ratio of 4.0, the mechanical properties of the composite fiber are excellent, but there may be a problem in that the thermal bonding strength of the composite fiber is poor.

[Resin for Sheath]

The resin for sheath may have a melting point of 150 to 200° C., and preferably, 160 to 190° C. In this case, if the melting point of the resin for sheath is less than 150° C., there may be a problem of not exhibiting thermal bonding properties, and if the melting point of the resin for sheath is more than 200° C., there may be a problem in that the product becomes hard and the soft touch may be significantly reduced, and therefore, it is preferable to constitute the resin for sheath with a melting point that satisfies the above range.

The resin for sheath that satisfies the above melting point range may be prepared by performing a first step of preparing an ester compound by esterifying an acid component and a diol component; and a second step of preparing a polycondensation reaction product by polycondensing a mixture including an ester compound and a titanium chelate catalyst represented by Chemical Formula 2 above.

In addition, the resin for sheath may be prepared by further performing a third step of mixing the polycondensation reaction product and a toner.

[Chemical Formula 2]

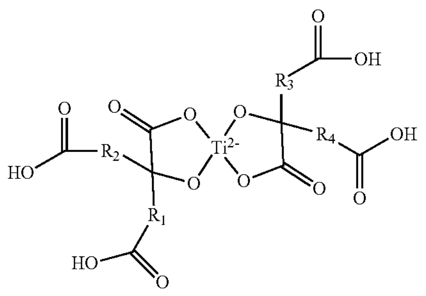

In Chemical Formula 2, $R_1$ to $R_4$ may each independently be a straight-chain alkylene group having 1 to 3 carbon atoms, preferably, may each independently be a straight-chain alkylene group having 1 to 2 carbon atoms, and more preferably, may be a straight-chain alkylene group having 1 carbon atom.

In this case, the polycondensation reaction may be performed by adding the catalyst to a reactant such that the content of titanium atoms is 5 to 30 ppm, and preferably, 10 to 20 ppm. If the content of titanium atoms is less than 5 ppm, the reaction rate is slowed such that productivity may decrease. Conversely, if the content of titanium atoms is more than 30 ppm, the reactivity is sufficient, but the catalyst acts as a foreign substance and spins the prepared polyester resin, and thus, there is a concern that physical properties such as mechanical strength and thermal adhesiveness of the prepared fiber may be reduced.

In addition, the ester reaction may be performed by adding the acid component and the diol component at a molar ratio of 1:1.0 to 1:2.0, and preferably, at a molar ratio of 1:1.1 to 1:1.5. If the molar ratio of the diol component is more than 1:1, acidity may be excessively increased during polymerization to promote side reactions, and if the molar ratio of the diol component is less than 1:2.0, the degree of polymerization may not be sufficient.

Hereinafter, the acid component and diol component in the first step when preparing the resin for sheath will be described.

First of all, the acid component may include isophthalic acid and terephthalic acid.

In this case, the isophthalic acid may be included in 20 to 40 mol %, and preferably, 25 to 35 mol %, in the acid component. If the isophthalic acid is included at less than 20 mol %, there may be a problem in that the adhesive temperature of the manufactured core-sheath-type composite fiber is increased or the thermal bonding property is lowered, and if it is included at more than 40 mol %, the thermal adhesiveness is excellent, but there may be a problem in that when manufacturing conjugated fibers, the defect rate increases due to poor spinnability.

In addition, the terephthalic acid may be included in the remaining amount except for the isophthalic acid in the acid component.

In addition, the acid component may further include at least one selected from $C_{6-14}$ aromatic polyvalent carboxylic acid, $C_{2-14}$ aliphatic polyvalent carboxylic acid and sulfonate metal salt, in addition to the isophthalic acid and terephthalic acid, and preferably, it may further include at least one selected from $C_{7-13}$ aromatic polyhydric carboxylic acids and $C_{4-12}$ aliphatic polyhydric carboxylic acids other than terephthalic acid as the acid component.

In this case, the $C_{6-14}$ aromatic polyhydric carboxylic acid other than isophthalic acid and terephthalic acid may be selected without limitation from those known as polyhydric carboxylic acid compounds that are used in the manufacture of polyester resins, but preferably, at least one selected from the group consisting of dimethyl terephthalate and dimethyl isophthalate may be used.

In addition, the $C_{2-14}$ aliphatic polyhydric carboxylic acid may be selected without limitation from those known as polyhydric carboxylic acids that are used in the preparation of polyester, but as non-limiting examples thereof, at least one selected from oxalic acid, malonic acid, succinic acid, glutaric acid, adipic acid, suberic acid, citric acid, pimelic acid, azelaic acid, sebacic acid, nonanoic acid, decanoic acid, lauric acid or dodecanoic acid and palmitic acid or hexadecanoic acid may be used.

Meanwhile, the diol component may include a compound represented by Chemical Formula 1 below.

[Chemical Formula 1]

HO—R—OH

In Chemical Formula 1, R may be a straight-chain alkylene group having 1 to 4 carbon atoms, a branched alkylene group having 2 to 5 carbon atoms or $—R_1OR_2—$, wherein R may preferably be a straight-chain alkylene group having 1 to 3 carbon atoms, a branched alkylene group having 3 to 4 carbon atoms or $—R_1OR_2—$, and wherein $R_1$ and $R_2$ may each independently be a straight-chain alkylene group having 1 to 3 carbon atoms, and preferably, it may be a straight chain alkylene group having 1 to 2 carbon atoms.

In addition, Chemical Formula 1 may more preferably include two or more compounds selected from compounds represented by Chemical Formulas 1-1 to 1-4 below.

[Chemical Formula 1-1]

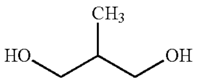

[Chemical Formula 1-2]

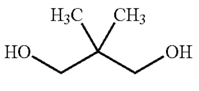

[Chemical Formula 1-3]

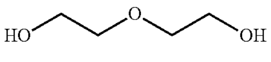

[Chemical Formula 1-4]

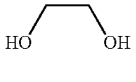

Preferably, the compound represented by Chemical Formula 1-1 may be included in an amount of 13 to 40 mol %, preferably, 20 to 40 mol %, and more preferably, 30 to 40 mol %, based on the total weight of the diol component. If the content of the compound represented by Chemical Formula 1-1 is less than 13 mol %, the spinnability is excellent when preparing fibers by spinning polyester resin, but the adhesive temperature may be increased or the thermal bonding properties may be deteriorated, and there is a disadvantage that the usage temperature is limited. In addition, if the content of the compound represented by Chemical Formula 1-1 is more than 40 mol %, spinnability is deteriorated and there may be a problem in that commercialization may be difficult, and rather, crystallinity may increase, resulting in deterioration in thermal bonding properties.

Meanwhile, when the compound represented by Chemical Formula 1-1 is used in an amount of 20 mol % or more, by manufacturing a polyester fiber by spinning a polyester resin prepared by using and reacting with a compound of Chemical Formula 1-2 or Chemical Formula 1-3, it is possible to further improve the thermal bonding properties at low temperatures.

When using the compound represented by Chemical Formula 1-2 as the diol component, it is recommended to use the same in an amount of 0.1 to 5 mol % based on the total amount of the diol component, and when using the compound represented by Chemical Formula 1-3 as the diol component, it is good to use the content of 0.1 to 20 mol % based on the total diol component.

In addition, when the compound represented by Chemical Formula 1-4 is used as a diol in combination with other diol compounds, the content of the compound represented by Chemical Formula 1-4 in the diol may be included in the remaining amount except for the compound including at least one selected from Chemical Formulas 1-1 to 1-3.

Meanwhile, the diol component may further include other diol components other than the compound represented by Chemical Formula 1, and a non-limiting example thereof may be a $C_{2-14}$ aliphatic diol component, and specifically, it may be at least one selected from the group consisting of 1,3-propandiol, 1,4-butandiol, 1,6-hexandiol, tetramethyl glycol, pentamethyl glycol, hexamethylene glycol, heptamethylene glycol, octamethylene glycol, nonamethylene glycol, decamethylene glycol, undecamethylene glycol, dodecamethylene glycol and tridecamethylene glycol.

In the preparation of the resin for sheath, the esterification reaction in the first step may be performed at 200 to 300° C., and preferably, at 230 to 270° C. If the esterification reaction is performed at less than 200° C., the polycondensation reaction may not occur due to insufficient heat of reaction, or a low molecular weight polycondensate may be formed, resulting in low strength and difficulty in fiberization. In addition, if it is performed at a temperature of more than 300° C., the decomposition of the polycondensate occurs due to the high reaction heat, making it difficult to secure the target high molecular-weight polycondensate, or diethylene glycol and various dimer side-reactants that are generated due to the high reaction heat other than the decomposition reaction may be generated such that there may be a problem in that these act as impurities, reducing the strength of conjugated fibers and causing yellowing.

In the preparation of the resin for sheath, the mixture in the second step may further include a phosphorus compound as a heat stabilizer. In this case, it is preferable to use phosphoric acid and a derivative thereof such as phosphoric acid, monomethyl phosphoric acid, trimethyl phosphoric acid and triethyl phosphoric acid as the phosphorus compound, and among these, trimethylphosphoric acid or triethylphosphoric acid is particularly preferable because of its excellent effect.

The content of the phosphorus compound is preferably included such that the weight of phosphorus atoms is 10 to 30 ppm based on the entire prepared resin. If the phosphorus compound is included in an amount of less than 10 ppm of phosphorus (P), there may be a problem of weakening physical properties due to excessive side reactions. Conversely, if phosphorus (P) is included in an amount of more than 30 ppm, there may be a problem with slow reaction speed.

Meanwhile, the polyester resin may further include a deodorant. A photocatalytic oxide doped with a transition metal may be used as the deodorant, and the transition metal is not particularly limited, but considering reactivity, it is preferable to use at least two selected from the group consisting of zinc (Zn), manganese (Mn), iron (Fe), copper (Cu), nickel (Ni), cobalt (Cr), vanadium (V), zirconium (Zr), molybdenum (Mo), silver (Ag), tungsten (W), bismuth (Bi), platinum (Pt) and gold (Au). Specific examples of the photocatalytic oxide include $TiO_2$, $SrTiO_3$, ZrO, $SnO_2$, $WO_3$, $Bi_2O_3$ and $Fe_2O_3$, but $TiO_2$ is particularly preferable, and more preferably, it is preferable to use $TiO_2$ having an anatase structure.

In the preparation of the resin for sheath, the third step is a process for applying a toner, wherein the toner may be included at 0.1 to 20 ppm, preferably, 0.1 to 15.0 ppm, and more preferably, at 1.0 to 10.0 ppm in the total weight of the resin for sheath (or sheath of conjugated fibers). In this case, if the toner usage is less than 0.1 ppm, the usage is too small such that the effect of adjusting the color tone of the conjugated fibers due to the usage of toner may be insufficient, and using more than 20 ppm is excessive use, and rather, since the adjustment of the color tone b* value of the conjugated fibers may be difficult, it is good to use the same within the above range.

In addition, it is preferable to use a non-cobalt-based dye that is less harmful to the human body, and preferably, it may include at least one selected from non-cobalt-based blue dye and non-cobalt-based red dye, and more preferably, in terms of fine control of color tone, the non-cobalt-based blue dye and the non-cobalt-based red dye may be mixed and used. When preparing the resin for core, when mixing a toner, non-cobalt blue dye and non-cobalt red dye may be mixed and used at a weight ratio of 1:0.3 to 0.8, and preferably, 1:0.3 to 0.6, to be suitable for matching the appropriate color (hue) of the conjugated fiber to be manufactured.

The polyester resin for sheath prepared by the above method may have a carboxyl group (—COOH) content of $4.5\times10^7$ eq/g or less, and preferably. $(1.0\text{ to }4.0)\times10^7$ eq/g. In addition, as an example of the method for measuring a carboxyl group content, it can be measured by the alcoholic NaOH titration method, and after dissolving the polyester resin in an oil bath at 240° C. by using a benzyl alcohol solvent, it may be measured by titrating 1/100N alcoholic NaOH. In this case, if the content of the carboxyl group is more than $4.5\times10^7$ eq/g, the yield of the polyester resin for sheath is prepared to be low, the molecular weight of the polyester resin for sheath is low, or the intrinsic viscosity is too low, and there may be a problem of low fiber strength.

In addition, the polyester resin for sheath may have a color b* value of the L*a*b* color system of 2.5 to 8.0, and preferably, 2.5 to 5.0.

In addition, the polyester resin for sheath may preferably be amorphous, and when it is included as a sheath in the sheath-core conjugated fiber, it may exhibit excellent fiber bonding function, and the good characteristics may also be implemented for the touch of the adhesive part after bonding.

Meanwhile, the sheath-core conjugated fiber manufactured by the above-described method may include the sheath and the core at a cross-sectional area ratio of 1:1.5 to 4.0, and preferably, at a cross-sectional area ratio of 1:1.8 to 3.0. If the cross-sectional area ratio of the core is less than 1.5 times, the strength of the supporter may also decrease as the strength of the conjugated fiber decreases, and if it is more than 4.0 times, the adhesive strength of the supporter may decrease.

[Resin for Core]

Next, the melting point of the resin for core used in preparing the core of the sheath-core conjugated fiber may be 230 to 260° C., and preferably, 235 to 245° C.

The resin for core may be prepared by performing a process including a first step of preparing an ester compound by esterifying an acid component and a diol component; and a second step of preparing a polycondensation reaction product by polycondensation of a mixture including the ester compound and the titanium chelate catalyst represented by Chemical Formula 2.

In addition, a third step of mixing the polycondensation reaction product and a toner may be further performed.

In preparation of the resin for core, the acid component of the first step may include terephthalic acid.

In addition, the diol component of the first step may include at least one selected from ethylene glycol, 1,3-propanediol, 1,4-butanediol and isopropanol, and preferably, it may include at least one selected from ethylene glycol and 1,3-propanediol.

In addition, the ester reaction may be carried out by including the acid component and the diol component at a molar ratio of 1:1.0 to 2.0, and preferably, at a molar ratio of 1:1.1 to 1.5. In this case, if the molar ratio of the diol component is less than 1, there may be a problem in that it is difficult to fiberize the polycondensate by using the prepared ester compound, and if the molar ratio of the diol component is more than 2, by-products may be excessively generated, and thus, it is good to use the same within the above range.

Further, in the preparation of the resin for core, the esterification reaction in the first step may be performed at 200 to 300° C., and preferably, 230 to 270° C., and under a pressure of 1,000 to 1300 torr, and preferably, 1,050 to 1,200 torr.

In the preparation for the resin for core, the mixture in the second step may include the ester compound in the first step and the titanium chelate catalyst represented by Chemical Formula 2.

The polycondensation reaction in the second step may be performed by adding the titanium chelate catalyst to the reactant such that the content of titanium atoms is 5 to 30 ppm, and preferably, 10 to 20 ppm. If the content of titanium atoms is less than 5 ppm, the reaction rate is slowed, and productivity may decrease. Conversely, if the content of titanium atoms is more than 30 ppm, the reactivity is sufficient, but the catalyst acts as a foreign substance and spins the prepared polyester resin, and thus, there is a concern that physical properties such as mechanical strength and thermal adhesiveness of the fabricated fiber may be reduced.

In the preparation of the resin for core, the mixture in the second step may further include a deodorant. A photocatalytic oxide doped with a transition metal may be used as the deodorant, and the transition metal is not particularly limited, but considering reactivity, it is preferable to use at least two selected from the group consisting of zinc (Zn), manganese (Mn), iron (Fe), copper (Cu), nickel (Ni), cobalt (Cr), vanadium (V), zirconium (Zr), molybdenum (Mo), silver (Ag), tungsten (W), bismuth (Bi), platinum (Pt) and gold (Au). Specific examples of the photocatalytic oxide include $TiO_2$, $SrTiO_3$, ZrO, $SnO_2$, $WO_3$, $Bi_2O_3$ and $Fe_2O_3$, but $TiO_2$ is particularly preferable, and more preferably, it is preferable to use $TiO_2$ having an anatase structure.

In addition, the mixture in the second step may further include titanium dioxide as a matting agent which is capable of improving the surface gloss of fibers, and in the case of semi dull (SD), it may be used at about 0.2% by weight or more, and preferably, 0.3 to 1.4% by weight of the total weight of the mixture, and in the case of full dull (FD), it may be used at 1.5% by weight or more of the total weight of the mixture.

In addition, the mixture of the second step may further include a heat stabilizer, and the heat stabilizer may include a phosphorus compound. In this case, it is preferable to use phosphoric acid and a derivative thereof such as phosphoric acid, monomethyl phosphoric acid, trimethyl phosphoric acid and triethyl phosphoric acid as the phosphorus compound, and among these, trimethylphosphoric acid or triethylphosphoric acid is particularly preferable because of its excellent effect. The content of the phosphorus compound is preferably included such that the weight of phosphorus atoms is 10 to 30 ppm based on the entire prepared resin. If the phosphorus compound is included in an amount of less than 10 ppm of phosphorus (P), there may be a problem of weakening physical properties due to excessive side reactions, and conversely, if phosphorus (P) is included in an amount of more than 30 ppm, there may be a problem with slow reaction speed.

In addition, the polycondensation reaction in the second step may be performed at 230 to 320° C., and preferably, at 270 to 300° C.

In addition, the polycondensation reaction may be performed under a pressure of 0.1 to 5.0 torr, and preferably, under a pressure of 0.3 to 1.0 torr, but the present invention is not limited thereto.

In addition, the third step is a process for applying a toner, wherein the toner may be included at 0.1 to 12.0 ppm, preferably, 1.0 to 10.0 ppm, and more preferably, 1.0 to 5.0 ppm, based on the total weight of the resin for core (or core of the conjugated fiber). In this case, if the amount of toner used is less than 0.1 ppm, the amount used is too small such that the effect of adjusting the color tone of the conjugated fiber due to the use of toner may be insignificant. In addition, using more than 10 ppm is an excessive usage, and it may be difficult to control the color tone b value (b*) of the conjugated fiber, and thus, it is better to use the same within the above range.

In addition, it is preferable to use a non-cobalt-based dye that is less harmful to the human body, and preferably, it may include at least one selected from non-cobalt-based blue dye and non-cobalt-based red dye, and more preferably, in terms of fine control of color tone, the non-cobalt-based blue dye and the non-cobalt-based red dye may be mixed and used. When preparing the resin for core, when mixing and using a toner, mixing and using non-cobalt blue dye and non-cobalt red dye at a weight ratio of 1:0.4 to 1.2, and preferably, 1:0.4 to 1.0 is suitable for matching the proper color (tone) of the conjugated fiber and/or tricot filter fabric to be manufactured.

Meanwhile, as another object of the present invention, it is possible to manufacture a supporter for a water treatment separation membrane including the above-described core-sheath composite fiber.

In this case, the supporter may include 1 ppm or less of a heavy metal element having an atomic mass of 63 to 200 Da (dalton) and a density of 4.0 g/cm$^3$ or more when measured according to the following measurement method, and preferably, it may include 0.7 ppm or less.

[Measurement Method]

After immersing a specimen cut to a weight of 0.7 g in 1,000 g of deionized water (DI water) having a purity of 99.9% or higher for 100 hours, it is taken out, and the concentration of metal elements eluted in the deionized water is measured.

In addition, the supporter may have an average pore size of 0.5 m or less, and preferably, 0.1 μm or less.

In addition, the supporter may have an average thickness of 50 to 200 mm, and preferably, 90 to 150 mm.

In addition, when the supporter for a water treatment separation membrane manufactured by using the sheath-core conjugated fiber as described above is manufactured by applying an organic toner to the polyester resin for sheath and core used in the manufacture of the conjugated fiber, the L*(L value) value may satisfy 82.0 to 95.0, preferably, 84.0 to 94.0, and more preferably, 85.0 to 92.0, when the color tone is measured according to the modified ASTM-D-1925 method. In addition, the b*(b value) value may satisfy 1.0 to 6.5, preferably, 1.5 to 5.0, and more preferably, 1.8 to 4.4.

In addition, the supporter may have an adhesive strength of 118 to 135 N/mm$^2$, and preferably, 120 to 130 N/mm$^2$.

In addition, the supporter for a water treatment separation membrane may be a non-woven fabric, and as an example of manufacturing the non-woven fabric, after mixing and opening the sheath-core conjugated fiber as described above and the PET (polyethylenephthalate) short fiber, it is mixed and opened at a weight ratio of 1:0.5 to 1.5, and then, a hot-melt non-woven fabric with a basis weight of 20 to 50 g/m$^2$ may be manufactured through multi-stage heat treatment at temperature conditions of 120° C., 140° C. and 160° C.

In addition, the manufacturing method of a water treatment separation membrane according to the present invention may include the steps of forming a support layer by performing primary coating and secondary coating on one or both sides of the above-described supporter; and forming an active layer on the surface of the support layer.

In this case, since the supporter is the same as described above, the description thereof will be omitted.

First of all, the primary coating may be performed by coating at least one selected from polysulfone polymer, polyacrylonitrile polymer and polyethersulfone polymer.

Next, any known polymer may be used without limitation for the secondary coating, and preferably, a functional polymer which is capable of imparting functionality to a porous substrate may be coated.

Next, since the active layer may preferably be a polyamide active layer, and since any known polyamide active layer may be used without limitation in the present invention, the detailed description of the active layer will be omitted in the present invention.

The water treatment separation membrane manufactured by the above-described method may include the support; a support layer which is formed on one side or both sides of the porous support; and an active layer which is formed on the surface of the support layer.

In addition, the separation membrane for water treatment may be a reverse osmosis membrane or a nanofiltration membrane.

As another object of the present invention, it is possible to manufacture a filter module including a filter which includes the water treatment separation membrane and is wound in a spiral shape on the outer surface of a perforated pipe.

In this case, the filter module may include at least one water treatment separation membrane, and preferably, it may be formed by stacking and winding several layers.

In addition, the filter module may be a cylindrical filter module.

Hereinafter, the present invention will be described in more detail through examples, but the following examples are not intended to limit the scope of the present invention, which should be interpreted to aid understanding of the present invention.

EXAMPLE

Preparation Example 1: Manufacture of Sheath-Core Conjugated Fiber for Supporter of Water Treatment Separation Membrane (1) Preparation of Polyester Resin for Sheath After introducing an acid component including 70 mol % of terephthalic acid (TPA) and 30 mol % of isophthalic acid (IPA), and a diol component including 12 mol % of a compound represented by Chemical Formula 1-3 below and 88 mol % of a compound represented by Chemical Formula 1-4 below at a molar ratio of 1:1.2 into an ester reaction tank, it was reacted under the conditions of 250° C. and 1,140 Torr to obtain an ester reaction product. The formed ester reaction product was transferred to a polycondensation reactor, and by introducing 15 ppm of a compound represented by Chemical Formula 2 below (based on Ti element content) as a polycondensation catalyst and 25 ppm of triethyl phosphate (based on P element content) as a heat stabilizer, a polycondensation reaction product was prepared by performing a polycondensation reaction by raising the temperature to 280° C. while gradually reducing the pressure to a final pressure of 0.5 Torr.

Next, a polyester resin for sheath was prepared by mixing the polycondensation reaction product with an organic toner mixed with a non-cobalt-based blue dye and a non-cobalt-based red dye at a weight ratio of 1:0.4. In this case, the content of the organic toner in the polyester resin for sheath was 3.0 to 6.0 ppm.

In addition, the prepared polyester resin for sheath had a melting point of 175° C.

[Chemical Formula 1-3]

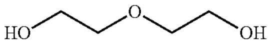

[Chemical Formula 1-4]

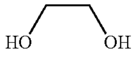

[Chemical Formula 2-1]

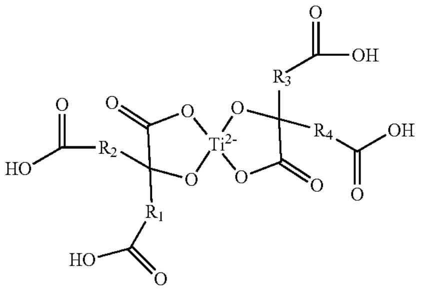

In Chemical Formula 1 above, $R^1$ to $R^4$ are each independently an alkylene group having 1 carbon atom.

(2) Preparation of Polyester Resin for Core

It was prepared in the same composition and method as the polyester resin for sheath, except that when preparing the ester reaction product, terephthalic acid as an acid component and ethylene glycol as a diol component were mixed at a molar ratio of 1:1.2 to prepare a polyester resin for core.

In this case, the melting point of the polyester resin for core was 245° C.

(3) Manufacture of Sheath-Core Conjugated Fiber

The polyester resin for core as a core and the polyester resin for sheath as sheath were spun at 5,000 mpm, and then, it was stretched at a stretching ratio of 2.2 times to manufacture a sheath-core conjugated fiber. The manufactured sheath-core conjugated fiber included a sheath and a core at a weight ratio of 1:2.33.

Preparation Example 2 to Preparation Example 7 and Comparative Preparation Example 1 to Comparative Preparation Example 4: Manufacture of Sheath-Core Conjugated Fiber for Supporter of Water Treatment Separation Membrane These were manufactured in the same manner as in Preparation Example 1, except that Preparation Example 2 to Preparation Example 7 and Comparative Preparation Example 1 to Comparative Preparation Example 4 were performed under the conditions of Tables 1 to 2 below.

[Chemical Formula 1-1]

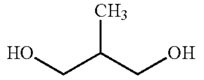

[Chemical Formula 1-2]

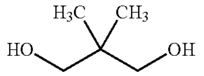

[Chemical Formula 1-3]

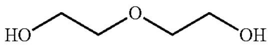

[Chemical Formula 1-4]

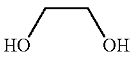

Experimental Example 1: Analysis of Terminal Group

The contents of the terminal carboxyl group (—COOH) of the polyester resins for sheath prepared in Preparation Examples 1 to 9 and Comparative Preparation Examples 1 to 6 were measured according to the 1/100 N alcoholic NaOH titration method.

0.15 g of polyester resin powder pulverized to a size of 20 mesh was precisely measured and placed in a test tube, and 5 mL of benzyl alcohol was added thereto, followed by heating and dissolving at 240° C. for 150 seconds while stirring with a micro stirrer. Immediately after dissolution, the test tube was immersed in water at 25° C. for 7 seconds to cool quickly, the contents were poured into a 50 mL beaker containing 10 mL of chloroform, and then, 5 mL of benzyl alcohol was added again to the test tube, and while it was stirred for 60 seconds, the remaining polyester resin solution was thoroughly rinsed and immediately added to the beaker to be used as a titrant. The content of carboxyl group was neutralized and titrated with 0.1N sodium hydroxide benzyl alcohol solution using a microsyringe (volume 100 μL) by using phenol red (0.1% benzyl alcohol solution) as an indicator, and the titration value was calculated by correcting the results of a blank test for the titration reagent.

TABLE 1

| Conjugated fiber | | | Preparation Example 1 | Preparation Example 2 | Preparation Example 3 | Preparation Example 4 | Preparation Example 5 |
|---|---|---|---|---|---|---|---|
| Sheath | Acid (100 mol %) | IPA (mol %) | 30 | 25 | 35 | 30 | 30 |
| | | TPA (mol %) | 70 | 75 | 65 | 70 | 70 |
| | Diol (100 mol %) | Chemical Formula 1-1 (mol %) | — | — | — | 20 | — |
| | | Chemical Formula 1-2 (mol %) | — | — | — | — | 20 |
| | | Chemical Formula 1-3 (mol %) | 12 | 12 | 12 | — | — |
| | | Chemical Formula 1-4 (mol %) | 88 | 88 | 88 | 80 | 80 |
| | Molar ratio of acid:diol | | 1:1.2 | 1:1.2 | 1:1.2 | 1:1.2 | 1:1.2 |
| | Content of catalyst (Ti element ppm) | | 15 | 15 | 15 | 15 | 15 |
| | Content of heat stabilizer (ppm) | | 25 | 25 | 25 | 25 | 25 |
| | Content of toner (ppm) | | 6 | 6 | 6 | 6 | 6 |
| | Content of terminal carboxyl group (×$10^7$ eq/g) | | 2.82~2.85 | 2.80~2.83 | 2.82~2.84 | 2.83~2.86 | 2.83~2.86 |
| | Melting point (° C.) | | 175 | 173 | 177 | 177 | 179 |
| Core | Acid (100 mol %) | TPA | 100 | 100 | 100 | 100 | 100 |
| | Diol (100 mol %) | Chemical Formula 1-2 (mol %) | 100 | 100 | 100 | 100 | 100 |
| | Molar ratio of acid:diol | | 1:1.2 | 1:1.2 | 1:1.2 | 1:1.2 | 1:1.2 |
| | Content of catalyst (Ti element ppm) | | 15 | 15 | 15 | 15 | 15 |
| | Content of heat stabilizer (ppm) | | 25 | 25 | 25 | 25 | 25 |
| | Content of toner (ppm) | | 6 | 6 | 6 | 6 | 6 |
| | Melting point (° C.) | | 245 | 245 | 245 | 245 | 245 |
| Cross-sectional area ratio of core:sheath | | | 1:2.33 | 1:2.33 | 1:2.33 | 1:2.33 | 1:2.33 |

TABLE 2

| Conjugated fiber | | | Preparation Example 6 | Preparation Example 7 | Comparative Preparation Example 1 | Comparative Preparation Example 2 | Comparative Preparation Example 3 | Comparative Preparation Example 4 |
|---|---|---|---|---|---|---|---|---|
| Sheath | Acid (100 mol %) | IPA (mol %) | 30 | 30 | 18 | 50 | 30 | 30 |
| | | TPA (mol %) | 70 | 70 | 70 | 70 | 70 | 70 |
| | Diol (100 mol %) | Chemical Formula 1-3 (mol %) | 12 | 12 | 12 | 12 | 12 | 12 |
| | | Chemical Formula 1-4 (mol %) | 88 | 88 | 88 | 88 | 88 | 88 |
| | Molar ratio of acid:diol | | 1:1.2 | 1:1.2 | 1:1.2 | 1:1.2 | 1:1.2 | 1:1.2 |
| | Content of catalyst (Ti element ppm) | | 15 | 15 | 15 | 15 | 15 | 15 |
| | Content of heat stabilizer (ppm) | | 25 | 25 | 25 | 25 | 25 | 25 |
| | Content of toner (ppm) | | 6 | 6 | 6 | 6 | 6 | 6 |
| | Content of terminal carboxyl group (×$10^7$ eq/g) | | 2.82~2.85 | 2.82~2.85 | 2.82~2.85 | 2.83~2.86 | 2.82~2.87 | 2.82~2.85 |
| | Melting point (° C.) | | 175 | 175 | 168 | 182 | 175 | 175 |

TABLE 2-continued

| Conjugated fiber | | | Preparation Example 6 | Preparation Example 7 | Comparative Preparation Example 1 | Comparative Preparation Example 2 | Comparative Preparation Example 3 | Comparative Preparation Example 4 |
|---|---|---|---|---|---|---|---|---|
| Core | Acid (100 mol %) | TPA | 100 | 100 | 100 | 100 | 100 | 100 |
| | Diol (100 mol %) | Chemical Formula 1-2 (mol %) | 100 | 100 | 100 | 100 | 100 | 100 |
| | Molar ratio of acid:diol | | 1:1.2 | 1:1.2 | 1:1.2 | 1:1.2 | 1:1.2 | 1:1.2 |
| | Content of catalyst (Ti element ppm) | | 15 | 15 | 15 | 15 | 15 | 15 |
| | Content of heat stabilizer (ppm) | | 25 | 25 | 25 | 25 | 25 | 25 |
| | Content of toner (ppm) | | 6 | 6 | 6 | 6 | 6 | 6 |
| | Melting point(° C.) | | 245 | 245 | 245 | 245 | 245 | 245 |
| Cross-sectional area ratio of core:sheath | | | 1:1.52 | 1:3.51 | 1:2.33 | 1:2.33 | 1:1.23 | 1:4.15 |

Example 1: Manufacture of Supporter for Water Treatment Separation Membrane

After the sheath-core conjugated fiber of Preparation Example 1 and polyethylene terephthalate (PET) short fibers (fiber length 51 mm, fineness 4.0 de) were mixed and opened at a weight ratio of 1:1, it was subjected to multi-stage heat treatment under the temperature conditions of 120° C., 140° C. and 160° C. to manufacture a hot-melt nonwoven fabric having a basis weight of 35 g/m$^2$. The manufactured water treatment membrane supporter had an average pore size of 0.05 m and an average thickness of 125 μm.

Example 2 to Example 7 and Comparative Example 1 to Comparative Example 4: Manufacture of Supporter for Water Treatment Separation Membrane Supporter were manufactured in the same manner as in Example 1, except that Examples 2 to 7 and Comparative Examples 1 to 4 were performed under the conditions shown in Table 3 below.

Experimental Example 2: Evaluation of Physical Properties and Performance of the Supporter The physical properties and performance of the supporters for water treatment separation membranes manufactured in Examples 1 to 7 and Comparative Examples 1 to 4 were evaluated in the following manner, and the results are shown in Table 3 below.

(1) Measurement of the Elution Amount of Heavy Metal

Specifically, specimens of the supporters were prepared in 99.9% pure deionized water (DI water). The weight of each specimen was 0.7 g.

Next, each of the specimens was immersed in the deionized water and allowed to stand at room temperature.

Next, after 24 hours, 48 hours, 70 hours and 90 hours, respectively, the amount of heavy metal elution was measured in the deionized water using ICP-MS (Perkin Elmer, NexION 300X). In this case, the heavy metal means antimony.

(2) Measurement of Colorimetric Values

The supporter for a water treatment separation membrane was cut into a size of 5 cm×5 cm to prepare a specimen, and after placing the specimen in a cell of a spectrophotometer of Konica Minolta Inc., L* and b* values were measured.

(3) Measurement of Adhesive Strength

Specimens of the supporters for the water treatment separation membrane were prepared in a size of 100 mm (L)×20 mm (W)×10 mm (D), and the adhesive strength was measured by using a universal testing machine (UTM) according to the KS M ISO 36 method.

TABLE 3

| Supporter | Conjugated fiber | Elution amount of heavy metals (ppm) | Colorimeter value L* | Colorimeter value b* | Adhesion strength (N/mm$^2$) |
|---|---|---|---|---|---|
| Example 1 | Preparation Example 1 | 0 | 88.1 | 2.9 | 124 |
| Example 2 | Preparation Example 2 | 0 | 88.3 | 2.8 | 120 |
| Example 3 | Preparation Example 3 | 0 | 88.0 | 2.9 | 130 |
| Example 4 | Preparation Example 4 | 0 | 87.8 | 2.8 | 126 |
| Example 5 | Preparation Example 5 | 0 | 88.4 | 2.7 | 123 |
| Example 6 | Preparation Example 6 | 0 | 87.7 | 3.4 | 135 |
| Example 7 | Preparation Example 7 | 0 | 89.8 | 2.5 | 118 |
| Comparative Example 1 | Comparative Preparation Example 1 | 0 | 88.7 | 2.7 | 89 |
| Comparative Example 2 | Comparative Preparation Example 2 | 0 | 87.8 | 3.0 | 137 |
| Comparative Example 3 | Comparative Preparation Example 3 | 0 | 87.1 | 3.6 | 139 |
| Comparative Example 4 | Comparative Preparation Example 4 | 0 | 92.2 | 2.1 | 84 |

Looking at the physical property measurement results of the supporters in Table 3, it was confirmed that the supporters of Examples 1 to 7 had no elution amount of heavy metal, had appropriate color difference values, and had high adhesive strength. Compared to Example 2 (using 25 mol % of IPA), the supporter including the sheath-core conjugated fiber manufactured by a resin using 18 mol % of IPA, which is less than 20 mol %, had a problem in that the adhesive strength of the supporter was rapidly lowered.

When preparing the polyester resin for sheath, the supporter including the sheath-core conjugated fiber manufactured by a resin using 50 mol % of IPA, which exceeds 40 mol %, showed the results of very excellent adhesive strength, compared to Example 3 (using 35 mol % of IPA). However, there was a problem in that the defect rate was very high due to poor spinnability during the manufacture of the sheath-core conjugated fiber.

In the case of Comparative Example 3, which is a supporter manufactured by conjugated fibers with a cross-sectional area ratio of sheath and core of less than 1:1.5, the adhesive strength was relatively excellent, but the strength of the conjugated fibers is low, and as a result, the strength of the supporter was also not good, compared to Examples 1 and 6.

Further, in the case of Comparative Example 4, which is a supporter manufactured by conjugated fibers with a cross-sectional area ratio of sheath and core of more than 1:4.0, it could be confirmed that compared to Examples 1 and 7, there was a problem in that the adhesive strength was relatively low.

Manufacture Example 1: Manufacture of Water Treatment Separation Membrane

The support layer was formed by performing the primary coating and the secondary coating on the supporter manufactured in Example 1.

In this case, the primary coating was performed by coating a polysulfone polymer, and the secondary coating was performed by coating a functional raw material.

Next, a separation membrane for water treatment was manufactured by forming a polyamide active layer on the surface of the support layer.

Although an exemplary embodiment of the present invention has been described above, the spirit of the present invention is not limited to the exemplary embodiments presented herein, and those skilled in the art who understand the spirit of the present invention may easily suggest other exemplary embodiments by modifying, changing, deleting or adding components within the scope of the same spirit, but this will also fall within the scope of the present invention.

The invention claimed is:

1. A sheath-core conjugated fiber for a supporter of a water treatment membrane, comprising a sheath and a core in a cross-sectional area ratio of 1:1.5 to 1:4.0, wherein the sheath comprises a polyester resin for sheath, wherein the polyester resin for sheath comprises a polycondensation product obtained by ester reaction and polycondensation reaction of an acid component; and a diol component, wherein the acid component comprises 20 to 40 mol % of isophthalic acid (IPA) and the remaining amount of terephthalic acid (TPA), wherein the diol component comprises 13 to 40 mol % of a compound represented by Chemical Formula 1-1 below and the remaining amount of a compound represented by Chemical Formula 1-4 below, or 0.1 to 5 mol % of a compound represented by Chemical Formula 1-2 below and the remaining amount of a compound represented by Chemical Formula 1-4 below:

Chemical Formula 1-1

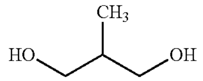

Chemical Formula 1-2

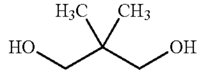

Chemical Formula 1-4

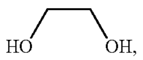

wherein the polyester resin for sheath has a carboxyl group (—COOH) content of (1.0 to 4.0)$\times 10^7$ eg/g.

2. A supporter for a water treatment separation membrane, comprising the sheath-core conjugated fiber of claim 1.

3. The supporter of claim 2, wherein in the supporter, when a specimen which is cut from the supporter to a weight of 0.7 g is immersed in 1,000 g of deionized water (DI water) with a purity of 99.9% or higher for 100 hours and then taken out and the concentration of a heavy metal element eluted in the deionized water is measured, the elution amount of heavy metal is 1 ppm or less, and wherein the heavy metal element has an atomic mass of 63 to 200 Da (dalton) and a density of 4.0 g/cm$^3$ or more.

4. A water treatment separation membrane, comprising:

the supporter of claim 2;

a support layer which is formed on one or both sides of the supporter; and an active layer which is formed on the surface of the support layer.

5. The water treatment separation membrane of claim 4, wherein the support layer comprises at least one selected from polysulfone polymer, polyacrylonitrile polymer and polyethersulfone polymer.

* * * * *